(12) United States Patent
Betts et al.

(10) Patent No.: US 9,848,596 B2
(45) Date of Patent: *Dec. 26, 2017

(54) PHOTOGRAPHIC CAMOUFLAGED SCENT-FREE GAME CALLS AND METHOD OF MANUFACTURING SAME

(71) Applicant: DOUBLE B CUSTOM CALLS, LLC, North Liberty, IA (US)

(72) Inventors: Christopher R. Betts, North Liberty, IA (US); Zachary Martin Hornberg, Keosauqua, IA (US)

(73) Assignee: Double B Custom Calls, LLC, North Liberty, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/053,535

(22) Filed: Feb. 25, 2016

(65) Prior Publication Data

US 2016/0242408 A1  Aug. 25, 2016

Related U.S. Application Data

(63) Continuation-in-part of application No. 14/022,373, filed on Sep. 10, 2013, now abandoned, which is a continuation of application No. 13/847,314, filed on Mar. 19, 2013, now Pat. No. 8,672,725.

(60) Provisional application No. 61/719,183, filed on Oct. 26, 2012.

(51) Int. Cl.
*A01M 31/00* (2006.01)

(52) U.S. Cl.
CPC .................. *A01M 31/004* (2013.01)

(58) Field of Classification Search
CPC .................................................. A01M 31/004
See application file for complete search history.

(56) References Cited

U.S. PATENT DOCUMENTS

| | | | |
|---|---|---|---|
| 2,518,616 A | 8/1950 | Herter | |
| 2,730,836 A | 1/1956 | Faulk et al. | |
| 3,066,444 A | 12/1962 | Dieckmann | |
| 4,151,678 A | 5/1979 | Robertson | |
| 4,816,259 A | 3/1989 | Matthews et al. | |
| 4,950,201 A | 8/1990 | Sceery | |
| 4,968,283 A | 11/1990 | Montgomery | |
| 5,019,008 A | 5/1991 | Hughes | |
| 5,090,937 A | 2/1992 | La Rue et al. | |
| 5,484,320 A | 1/1996 | Becker | |
| 5,778,590 A | 7/1998 | Browning et al. | |
| 6,053,794 A * | 4/2000 | Weiser | A01M 31/004 446/207 |

(Continued)

OTHER PUBLICATIONS

Flambeau Painted Lady Duck Call Lure by Flambeau; Image from Amazon.com.

(Continued)

*Primary Examiner* — Gene Kim
*Assistant Examiner* — Alyssa Hylinski
(74) *Attorney, Agent, or Firm* — Simmons Perrine Moyer Bergman PLC

(57) ABSTRACT

A scent-free game call configured to emulate a sound of a predetermined species of animal, the call comprising a mouthpiece section, with a digitally reproduced image displayed thereon, in a manner such that the digitally reproduced image specifically relates to said predetermined species.

17 Claims, 13 Drawing Sheets

(56) References Cited

U.S. PATENT DOCUMENTS

| | | | |
|---|---|---|---|
| 6,527,614 B1* | 3/2003 | Primos | A01M 31/004 446/207 |
| 7,608,002 B2 | 10/2009 | Robert et al. | |
| 7,658,660 B1 | 2/2010 | Drury | |
| 7,918,709 B1* | 4/2011 | Primos | A01M 31/004 446/202 |
| 8,287,631 B2 | 10/2012 | Baum et al. | |
| 8,672,725 B1* | 3/2014 | Betts | A01M 31/004 446/207 |
| 2003/0104884 A1 | 6/2003 | Eastman | |
| 2005/0133947 A1* | 6/2005 | Jang | B29C 39/025 264/162 |
| 2005/0150073 A1 | 7/2005 | Sham | |
| 2006/0141185 A1 | 6/2006 | Takahashi | |
| 2008/0274318 A1 | 11/2008 | Takada et al. | |
| 2008/0297685 A1 | 12/2008 | Sugibayashi et al. | |
| 2009/0017269 A1 | 1/2009 | Johnson | |
| 2009/0258566 A1* | 10/2009 | May | A01M 31/004 446/208 |
| 2011/0265953 A1* | 11/2011 | Kroell | B41M 5/025 156/378 |

OTHER PUBLICATIONS

Willie's Camo Max Duck Call by Willie Robertson; Image from L.L. Bean Website.

\* cited by examiner

PHOTOGRAPHIC CAMOUFLAGED SCENT-FREE GAME CALLS AND METHOD OF MANUFACTURING SAME

CROSS-REFERENCE TO RELATED APPLICATION

This application is a continuation in part and claims the benefit of the filing date of the non-provisional patent application with the same title and filed by Christopher R. Betts on Sep. 10, 2013, and having Ser. No. 14/022,373; which was a continuation of the non-provisional patent application with the same title and filed by Christopher R. Betts on Mar. 19, 2013, having Ser. No. 13/847,314, issued on Mar. 18, 2014 with U.S. Pat. No. 8,672,725 and the filing date of the provisional patent application with the same title and filed by Christopher R. Betts on Oct. 26, 2012, and having Ser. No. 61/719,183, which application are incorporated herein by reference in its entirety.

BACKGROUND OF THE INVENTION

The present invention generally relates to game calls and, more particularly, to camouflaged and decorative game calls.

In the past, it is well known to have painted game calls, where the exterior of the call is painted with various patterns or images.

Camouflage calls have been painted for many years, and have enjoyed considerable success in the past. However, these calls have had several drawbacks.

When these painted calls are used, they usually are exposed to moisture and are frequently subjected to physical impacts, which can dent or scratch the exterior surface of the call, increasing the potential for paint fragmentation to occur. Since, by their design, calls are made to contact the mouth of the hunter, ingestion of minute paint fragments from the exterior painted surface is a distinct possibility. Additionally, camouflaged game calls may have been painted with paint containing undesirable compounds, such as latex, which can be problematic for some hunters, or Volatile Organic Compounds, or VOCs, which may cause an undesirable effluent of VOCs, which could be especially problematic if used with a deer grunt call or an elk bugle call, where even the smallest unnatural scent could possibly be recognized by such big game animals as something to avoid.

Consequently, there exists a need for improved methods and apparatuses for providing calls which are camouflaged, or otherwise decorated, while minimizing the potential for ingestion of paint fragments, and reducing the problems associated with VOCs emanating from a painted surface.

SUMMARY OF THE INVENTION

It is an object of the present invention to provide enhanced abilities to reduce ingestion of paint fragments, and release of VOCs from painted surfaces, while using hunting game calls.

It is a feature of the present invention to include in the game call, an inner acrylic tube with a patterned image thereon.

It is an advantage of the present invention to reduce paint fragment ingestion and VOC release from painted surfaces.

It is another object of the present invention to provide for increased ability to accommodate lathe customization of a game call blank after a patterned image has been applied.

It is another feature of the present invention to provide a transparent molded epoxy resin layer exterior to the surface of the patterned image.

It is another advantage of the present invention to create a market for unfinished game call blanks which have a painted decorative pattern thereon, which can be customized by turning on a lathe without disturbing the painted decorative pattern.

The present invention is an improved method and apparatus for providing customized and customizable game calls and game call blanks, which improvement is designed to satisfy the aforementioned needs, provide the previously stated objectives, include the above-listed features, and achieve the already articulated advantages. The present invention is carried out in a "paint fragment and paint VOC-less" system in the sense that a substantial reduction in number of paint fragments that will be ingested and paint VOCs released by the painted game call of the present invention.

Accordingly, the present invention relates to a photographically patterned camouflage scent-free game call comprising:
a game call reed insert;
a game call reed cover, which is matched with said game call reed insert, so that when said game call reed insert is inserted into said game call reed cover, and air is blown through said game call reed cover, a sound is made which emulates a sound made by an animal;
said game call reed cover further comprising:
an inner tube, wherein said inner tube has an inner cylindrical surface and an outer cylindrical surface; said inner cylindrical surface being sized and configured to receive and to retain, with friction therein, a portion of said game call reed insert;
a first predetermined patterned image disposed on said outer cylindrical surface of said inner tube;
an outer transparent member;
said outer transparent member having a cylindrical inner surface; and
a contoured outer surface, having a differential thickness characteristic, through which said first predetermined patterned image can be seen.

The invention further relates to a method of making a scent-free printed game call comprising the steps of:
providing a game call reed insert; comprising:
a reed;
a sounding board, disposed immediately adjacent to said reed; where said sounding board and said reed are configured to emulate a sound of a predetermined species;
a hollow handle end coupled to said sounding board;
providing a tube having an inner cylindrical surface and an outer cylindrical surface; said inner cylindrical surface being sized and configured to receive and to retain, with friction therein, a portion of said game call reed insert, including said sounding board and said reed;
disposing a first predetermined patterned image around said outer cylindrical surface; and
disposing a transparent cover with a cylindrical inner cover surface over said first predetermined patterned image.

Lastly, the invention relates to a game call comprising:
a game call reed insert;
a game call reed cover, which is matched with said game call reed insert, so that when said game call reed insert is inserted into said game call reed cover, and air is blown through said game call reed cover, a sound is made which emulates a sound made by an animal;

said game call reed cover further comprising:

an inner tube, wherein said inner tube has an inner cylindrical surface and an outer cylindrical surface; said inner cylindrical surface being sized and configured to receive and to retain, with friction therein, a portion of said game call reed insert;

a first predetermined patterned image disposed on said outer cylindrical surface of said inner tube;

an outer transparent member; and said outer transparent member having a cylindrical outer member inner surface and an outer member outer surface which is non-parallel with respect to said cylindrical outer member inner surface.

BRIEF DESCRIPTION OF THE DRAWINGS

The invention may be more fully understood by reading the following description of preferred embodiments of the invention, in conjunction with the appended drawings wherein.

DETAILED DESCRIPTION

Figure 1:
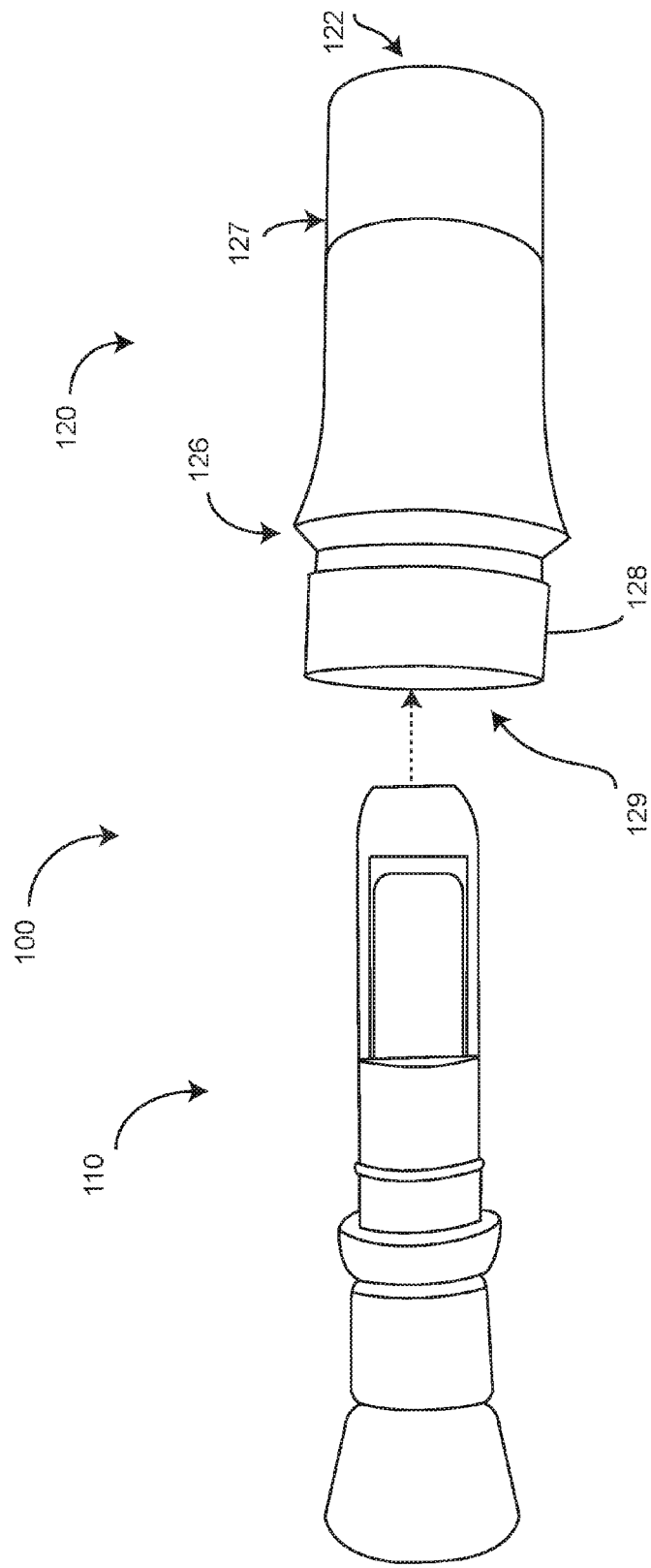
FIG. 1 is an exploded perspective view of a game call of the present invention.

Now referring to the drawings, wherein like numerals refer to like matter throughout, and more particularly to FIG. 1, there is shown a camouflaged game call 100 of the present invention, which includes a camouflaged game call reed/hand piece insert 110, and a camouflaged game call mouthpiece/reed cover 120. The call is shown in an all white camouflage but other more elaborate patterns of contrasting colors could be substituted as well. Camouflaged game call reed/hand piece insert 110 is shown as a double reed duck call insert, however, this is merely an example of many different inserts which could be utilized to make many different types of game calls. The present invention is focused upon the camouflaged game call mouthpiece/reed cover 120 which is adapted and configured to receive whatever insert is utilized for any particular call application. Camouflaged game call mouthpiece/reed cover 120 is shown as a camouflage call; however the image or pattern that is displayed is variable with many different types of camouflage, and many different types of decorative and non-camouflage patterns. The camouflaged game call mouthpiece/reed cover 120 has a mouth contact end 122 and an opposing reed insertion end 129. Camouflaged game call mouthpiece/reed cover 120 is shown with a lathe-turned contoured outer epoxy resin surface 126 which is transparent, and permits the camouflage image to be seen clearly. There is also shown an optional internal information displaying ring 127, which could be decorative or used to provide information about the call, such as manufacturers' name, model and even a serial number for custom calls. Optional internal information displaying ring 127 is disposed outside of the camouflage image, but inside of the lathe-turned contoured outer epoxy resin surface 126. Also shown is an optional exterior decorative ring 128, which is shown as a ring which matches the camouflaged game call reed/hand piece insert 110, and is disposed outside of the lathe-turned contoured outer epoxy resin surface 126.

Figure 2:
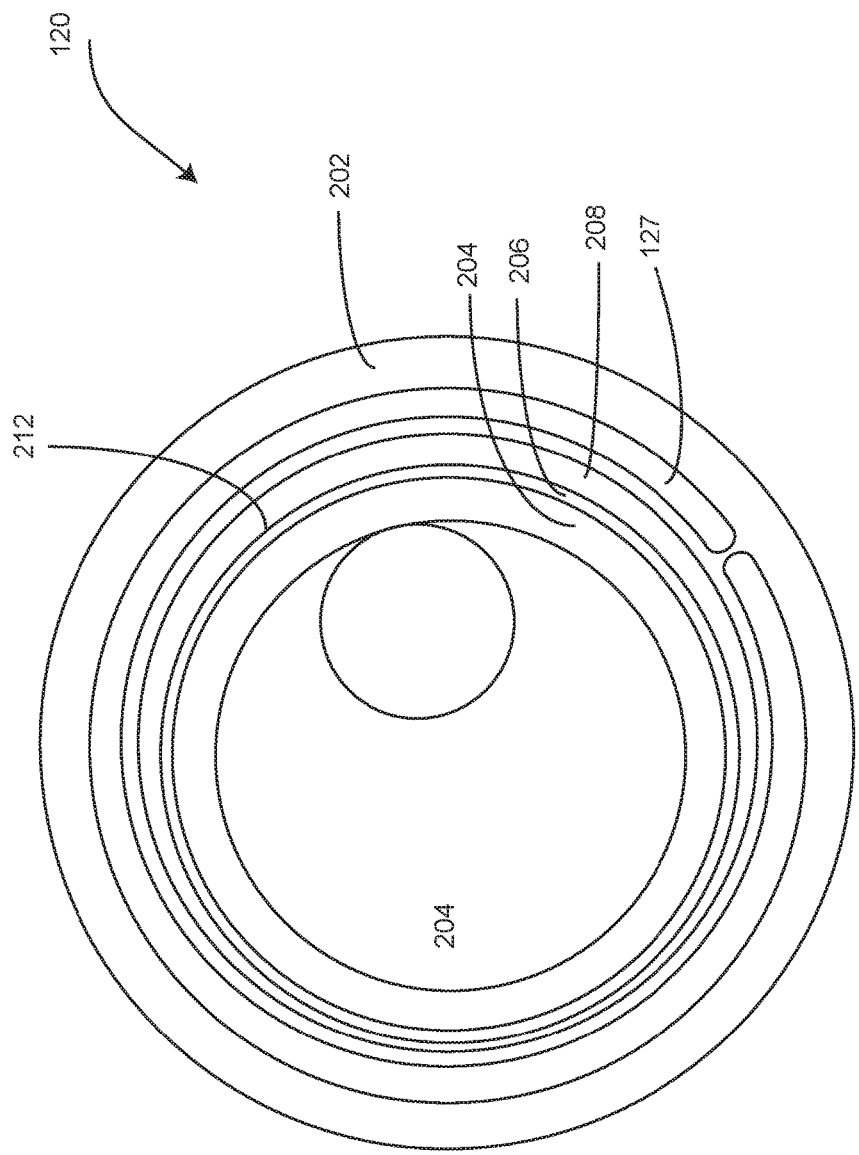
FIG. 2 is an enlarged end-view of the game call of FIG. 1.

Now referring to FIG. 2, there is shown an end-view of the camouflaged game call mouthpiece/reed cover 120 of FIG. 1. Camouflaged game call mouthpiece/reed cover 120 is shown as having a clear epoxy resin exterior surface 202, which is similar to the lathe-turned contoured outer epoxy resin surface 126 of FIG. 1, except that it is not as thick as the thickest portion shown in FIG. 1. Camouflaged game call mouthpiece/reed cover 120 comprises an acrylic inner tube 204, which has had applied thereto an acrylic inner tube base-coat paint 206. Applied to the acrylic inner tube base-coat paint 206, is acrylic inner tube patterned image 208. Clear epoxy resin interior surface 212 is shown disposed adjacent to acrylic inner tube patterned image 208; however, there may be a very thin layer of VOC clear coat applied over the acrylic inner tube patterned image 208, and therefore between the acrylic inner tube patterned image 208 and the clear epoxy resin interior surface 212. Also shown is optional internal information displaying ring 127.

The present invention can be manufactured using the following process:

Full length 36" acrylic tubes are cut into 2⅝ inch (2.625) length sections. Each cut section is then hand sanded, at both ends, to ensure a smooth and clean finish (see FIG. 2 #204). Each cut tube is then cleaned, with Alcohol, to rid the substrate of any contaminates, and installed onto "jigs" (12 tubes per jig). Each Jig is then transferred to the spray booth, where the tubes go through another cleaning using Lacquer thinner. This process eliminates any further contaminates and prepares the tubes for their base-coat color.

Once the acrylic tubes 204 have dried, the base-coat 206 is now applied to the tubes in preparation for the next step, which is the Hydrographic Printing (depending upon the style/effect that is to be achieved; the base-coat 206 can be Waterborne, designed specifically for Hydrographic Printing, or VOC style paint).

After the base-coat 206 has been allowed to dry thoroughly, they are removed from the paint booth to the dipping area. Once in the dipping area, a printed pattern PVA (poly-vinyl alcohol) film is cut to size for each jig that is to be hydro-dipped. The cut film is then transferred over to a specially designed dipping tank, where it lays suspended on heated water at 39 degree C. to hydrate the film for approximately 60 seconds. (*note: temperature and time varies depending upon manufacturer/style of printed pattern.)

Once the hydration period ends, an "activator", specially manufactured to use in Hydrographic printing, is applied with a spray gun to the top of the film as it lies on the water. This releases the ink from the PVA film and the ink is now floating on the water. The base-coated tubes, which are in sets of 12 per jig, are then strategically dipped through the floating ink at a specific angle. As the tubes are being submerged through the floating ink, the ink/film 208 wraps around the tubes and becomes "infused"/etched onto the base-coat. When fully submerged, the tubes are completely wrapped in the pattern 208 and are then taken to the rinse area, where they remain for three to five minutes to remove any and all residue left behind from the activated film. They are then removed from the rinse area, blown off with air to remove excess water, and then hung on a rack to dry thoroughly.

After the tubes have dried completely, they are transferred to the spray booth, where a VOC clear coat is applied to preserve the image 208 from any damage; and remain there until the clear coat has completely dried. Once dry, the tubes are ready to be transferred to the molding boxes.

Molding boxes can be specifically designed and fabricated from Aluminum and Silicone molding material, which could be AeroMarine 128 Silicone Moldmaking Rubber (available from AeroMarine Products Inc. of 8659 Production Avenue San Diego, Calif. 92121) to meet the specs in the design of the duck calls. "Dummy" blanks could be used in making the silicone mold to achieve the specifications and dimensions of the actual duck call "blanks". The box dimensions are approximately 3" w×4" h×34" l, and can generate 12 calls per box. The front plate on each box is removable to allow access for extraction of the molded pieces, which are referred to as "blanks".

Each hydro-dipped tube 204, 206 and 208 (also optional internal information displaying ring 127 could be included at this point) is then transferred to a ⅝" aluminum rod, where each end of the decorated tube is sealed with 401 Locktite to prevent air bubbles from forming due to the heat generated by the epoxy curing during the molding process. While the sealant is drying, the silicone mold is being prepared by applying petroleum jelly to all exposed areas of the mold as a releasing agent. The aluminum rods, with the decorated tubes, are then inserted into the box, leaving the tube suspended and centered in each of the 12 areas where the blanks are formed. The box is then assembled and transferred to the pouring area.

A mixture of Cycloaliphatic Clear Epoxy resin, which could be AeroMarine Cycloaliphatic "Non Blushing" Clear Epoxy #300/21 (and is available from AeroMarine Products Inc. of 8659 Production Avenue San Diego, Calif. 92121) is mixed (2:1 ratio) and is then poured into each mold of 12 until full, and allowed to cure. This resin is a latex-free food-safe resin. Other similar resins could be used as well. Cure time varies between 8-12 hours, depending upon external room temperature. Once the epoxy has cured, each box is then disassembled and the call "blanks" are removed from the mold, and inspected for defects/bubbles.

FIG. 2 is a cross-sectional picture of the encapsulated tube in the epoxy resin lathe-turned contoured outer epoxy resin surface 126.

The blank, i.e. camouflaged game call mouthpiece/reed cover 120, is shown after machining to desired shape. It was mounted on an expanding mandrel for the lathe. Once the desired shape is established, you can then finish with a final polish and buffing. If desired, a decorative band, i.e. optional exterior decorative ring 128, can be added at this stage as well by using an arbor press and pressing the band on the base of the machined and polished part.

The terms camouflage and camouflaged are intended to mean more than just one particular type or style of camouflage. Many commercial and well known designer camouflage patterns exist. The means of the term is intended to be inclusive, and a call which is all white could be considered camouflaged for winter use.

Figure 3:
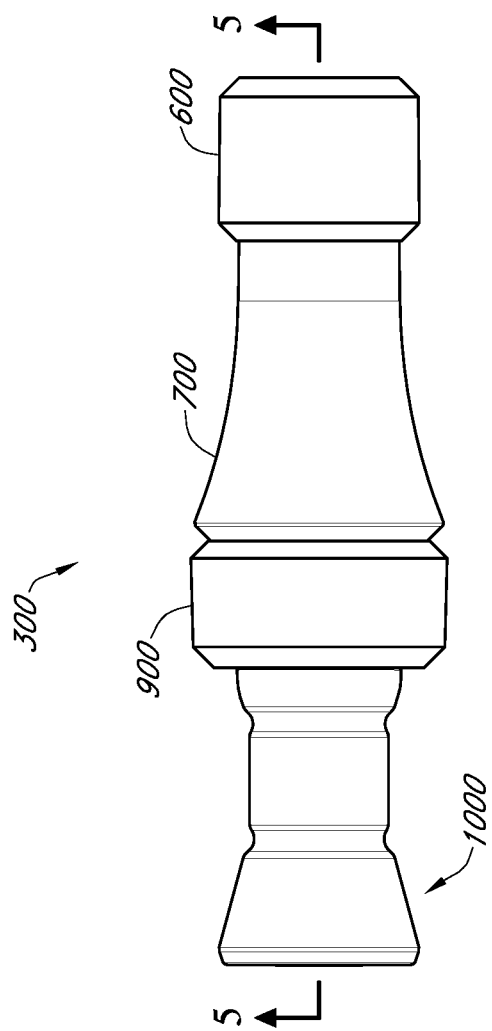
FIG. 3 is a perspective view of a game call that is one embodiment of the present invention.

Now referring to FIG. 3, there is shown an alternate embodiment of the present invention generally designated 300, which includes a game call mouthpiece 600, transparent cover 700 with an inner tube disposed therein, an outlet end cap 900, and a game call reed insert portion 1000.

Figure 4:
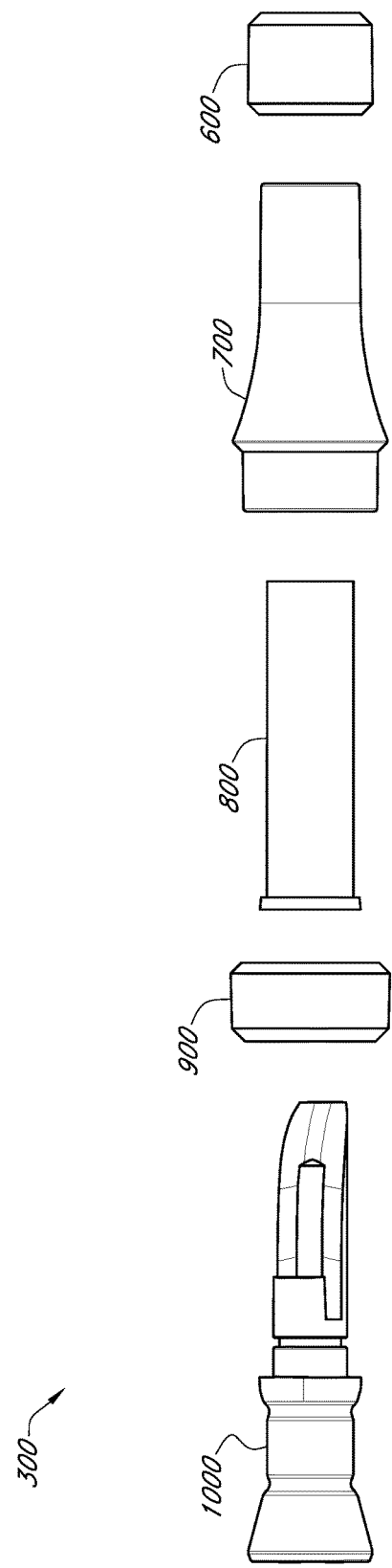
FIG. 4 is an exploded perspective view of the game call of FIG. 3.

Now referring to FIG. 4, there is shown an exploded view of the game call 300 of FIG. 3 where the inner tube 800 is shown outside of the transparent cover 700. Note that portions of the game call reed insert portion 1000, such as the reed(s) and the O ring are not included, but would be in a working embodiment of the present invention.

Figure 5:
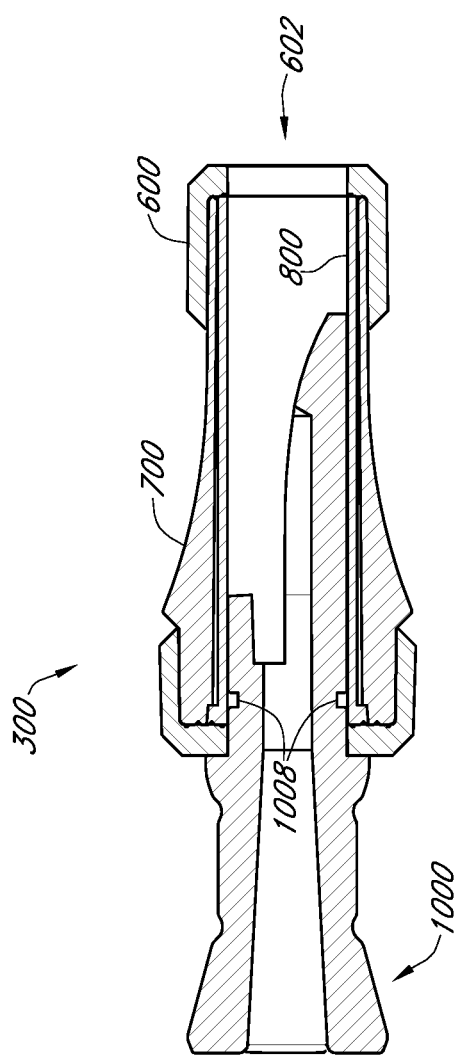
FIG. 5 is a cross-section view of the game call of FIG. 3.

Now referring to FIG. 5, there is shown a cross-sectional view of the game call 300 in a partially assembled state. The reed(s) and O ring, which are a part of the present invention, are not shown.

Figure 6:
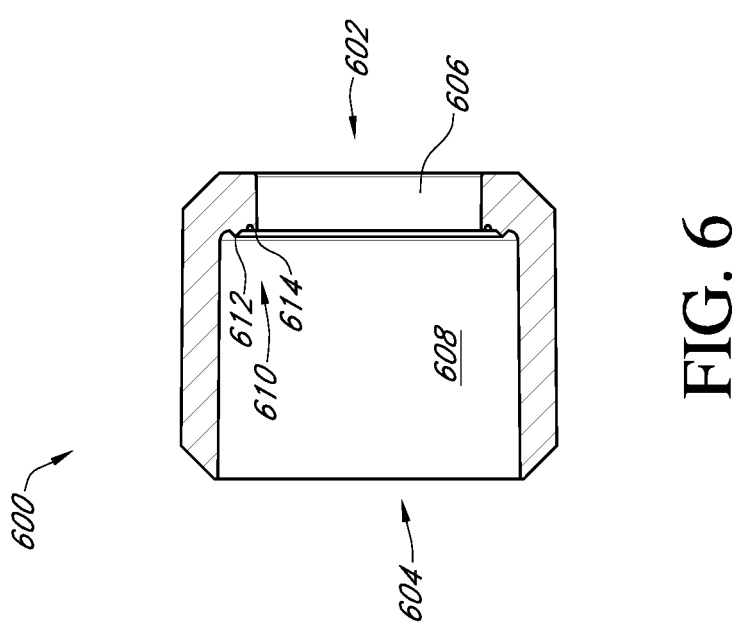
FIG. 6 is a cross-section view of a component of the game call of FIG. 3.

Now referring to FIG. 6, there is shown a game call mouthpiece 600 with a game call mouthpiece air inlet end 602 and an opposing game call mouthpiece air outlet end 604. Game call mouthpiece cap section 606 comprises a void for air to enter and a game call mouthpiece to transparent cover sealing section 610 formed at the interface with game call mouthpiece to transparent cover mating section 608. Game call mouthpiece to transparent cover sealing section 610 has a seal section first protuberance 612 and a seal section second protuberance 614 disposed thereon, each of which could be an annular protuberance with adjacent annular grooves. These protuberances and grooves are not as visibly pronounced as in FIG. 5 because that image is of these pieces after the transparent cover 700 and inner tube 800 (FIGS. 7 and 8, respectively) have been ultrasonically welded to each other and to game call mouthpiece 600 and outlet end cap 900 (FIG. 9). Alternate method of coupling these components could be employed, such as use of adhesives. The preferred embodiment may be ultrasonic welding.

Figure 7:
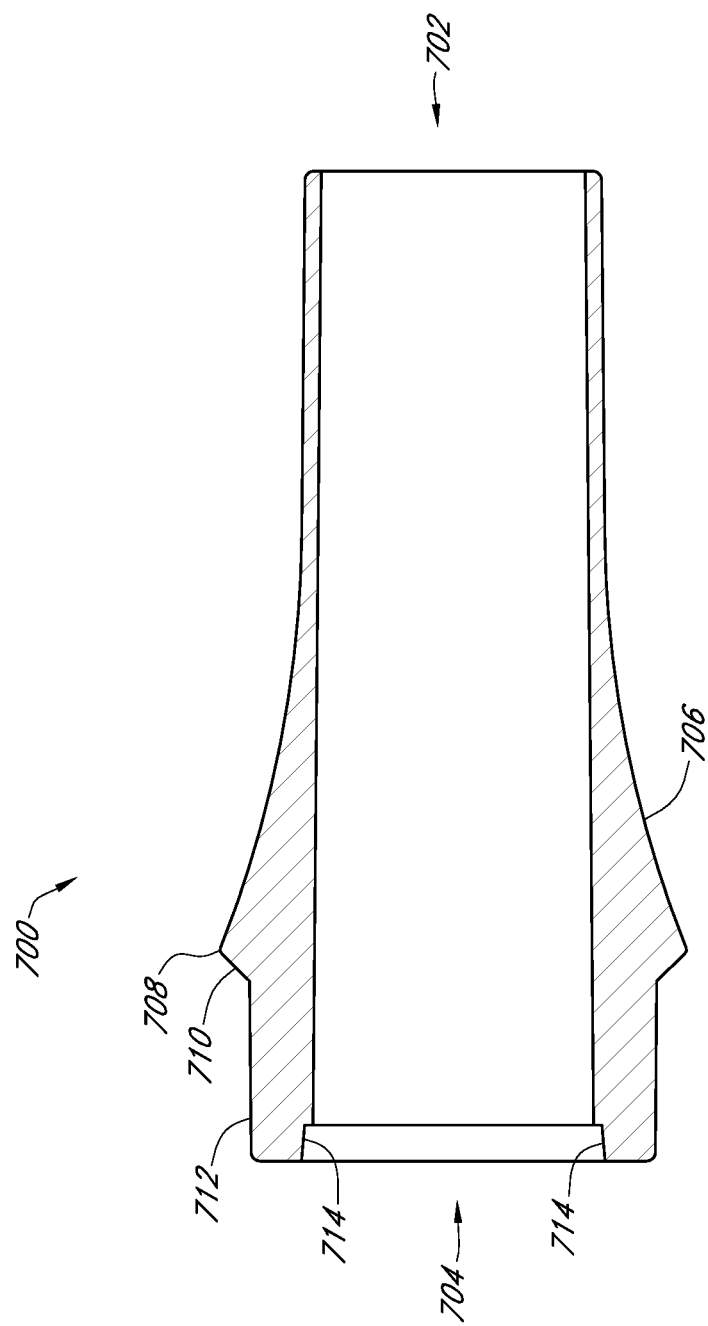
FIG. 7 is a cross-section view of a component of the game call of FIG. 3.
Figure 8:
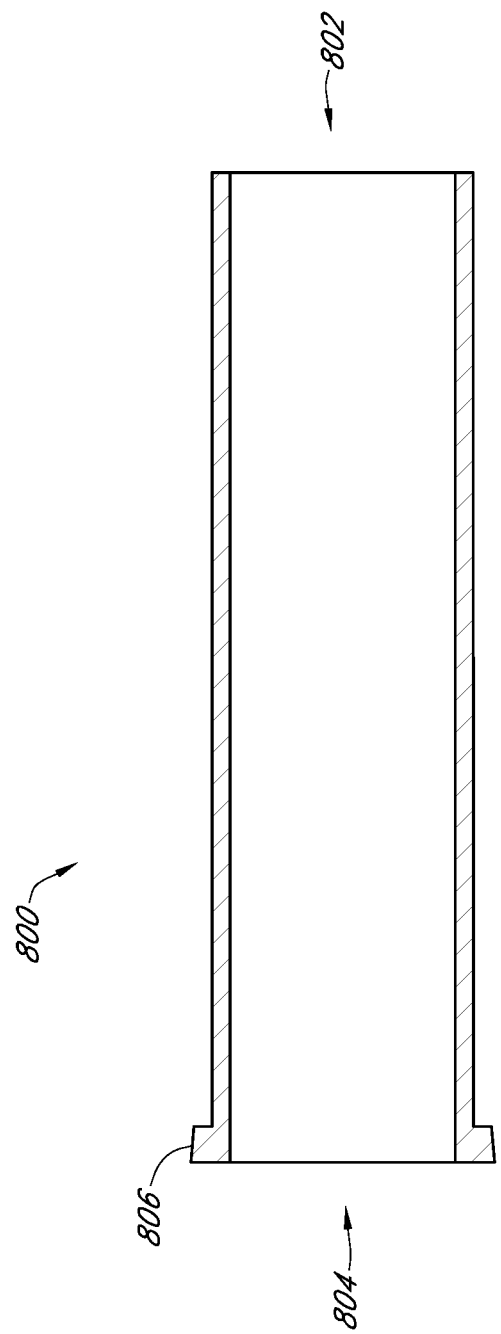
FIG. 8 is a cross-section view of a component of the game call of FIG. 3.
Figure 9:
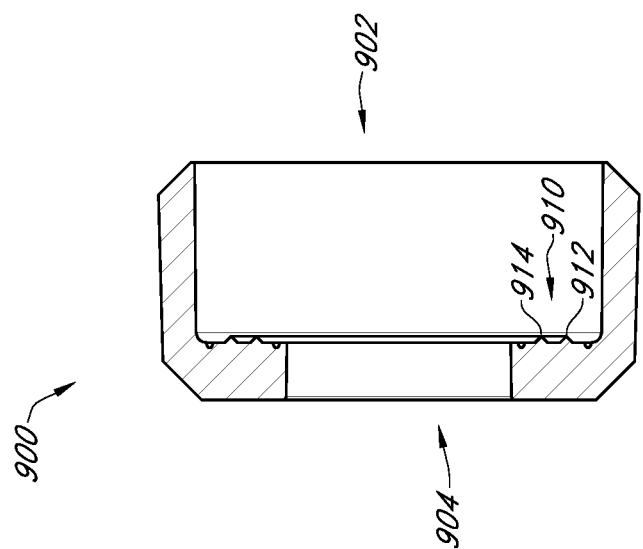
FIG. 9 is a cross-section view of a component of the game call of FIG. 3.

Now referring to FIGS. 7 and 8, there is shown a cross-section view of a transparent cover 700 having a transparent cover inlet end 702 and an opposing transparent cover outlet end 704. Transparent cover 700 is transparent and made of molded or machined materials which are suitable. It is shown with a transparent cover increasing thickness portion 706, a transparent cover maximum thickness portion 708, a transparent cover decreasing thickness portion 710, and a transparent cover constant thickness portion 712 thereon. Also shown is inner tube flange receiving void 714. The interior surface of transparent cover 700 is sized and configured to receive therein inner tube 800, which has an inner tube inlet end 802, an opposing inner tube outlet end 804 with an attached inner tube outlet end annular flange 806. Inner tube 800 may be made of the same material as game call mouthpiece 600 or inner tube 800, or a suitable substitute.

Now referring to FIG. 9, there is shown an outlet end cap 900 having an outlet end cap inlet 902 and an opposing outlet end cap reed insert receiving end 904. Outlet end cap to transparent cover sealing section 910 is shown where the transparent cover outlet end 704 and inner tube outlet end 804 meet with and preferably seal to the outlet end cap 900. Outlet end cap to transparent cover sealing section 910 is shown having an outlet end cap seal section first protuberance 912 and an outlet end cap seal section second protuberance 914, which could be concentric annular protuberances. Like the seal section first protuberance 612 and seal section second protuberance 614, these protuberance are not shown in FIG. 5 because the process of ultrasonically welding causes these protuberances to melt into the groove therebetween.

Figure 10:
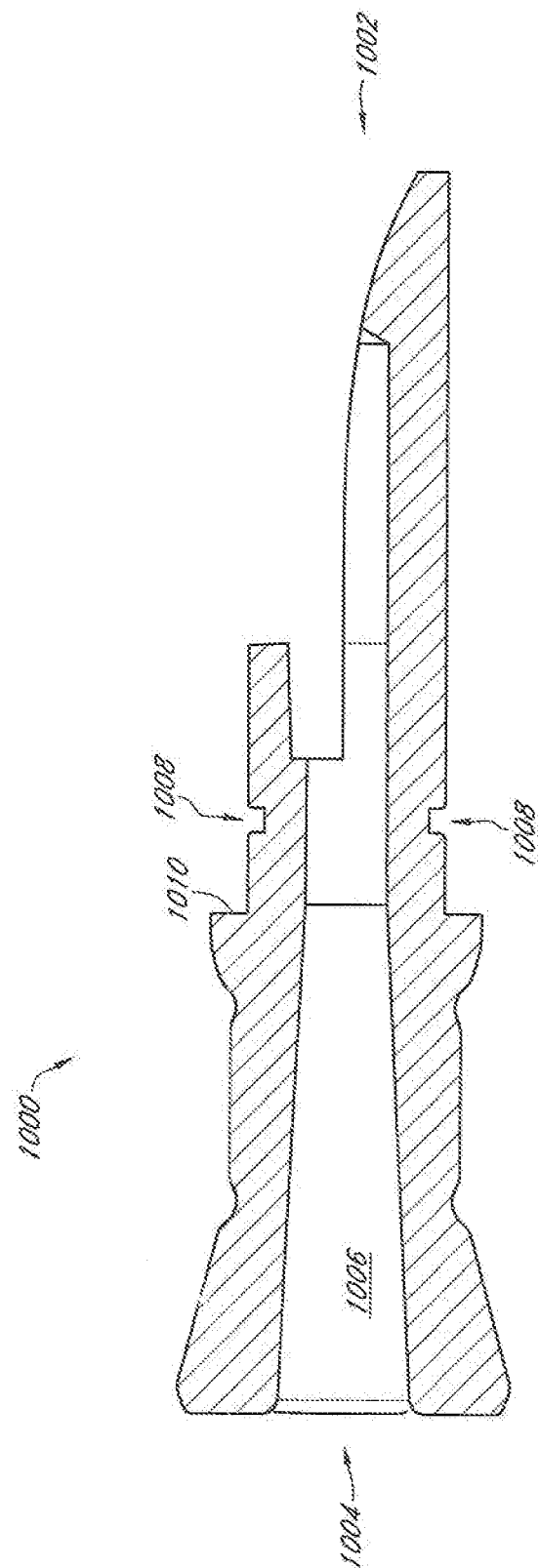
FIG. 10 is a cross-section view of a component of the game call of FIG. 3.

Now referring to FIG. 10, there is shown a game call reed insert portion 1000 which is similar to numerous prior art reed inserts in overall function and design and it includes a game call reed insert inlet end 1002, a opposite end 1004, a game call reed insert air passage void 1006, a game call reed insert O ring receiving void 1008, and a game call reed insert to outlet end cap stop portion 1010.

Figure 12:
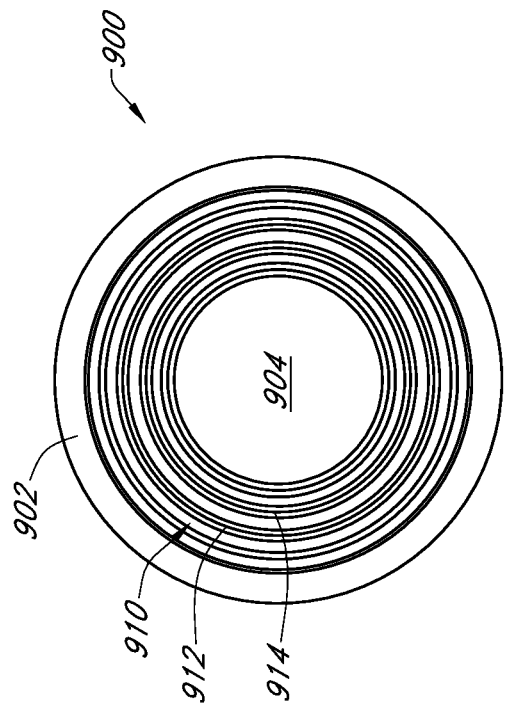
FIG. 12 is an end view of the component of FIG. 9.
Figure 11:
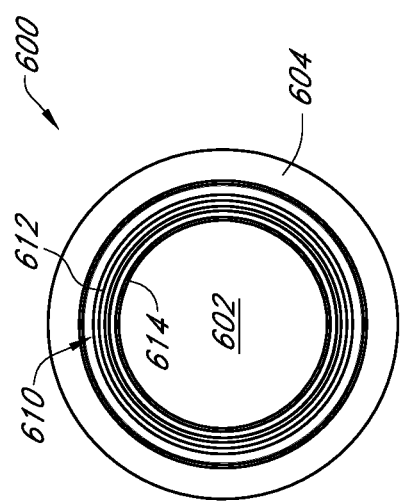
FIG. 11 is an end view of the component of FIG. 6.

Now referring to FIGS. 11 and 12, there is shown an end view of the game call mouthpiece 600 and the outlet end cap 900 with the seal section first protuberance 612 and seal section second protuberance 614 and the outlet end cap seal section first protuberance 912 and outlet end cap seal section second protuberance 914, respectively, before assembly and before any ultrasonic welding.

Figure 13:
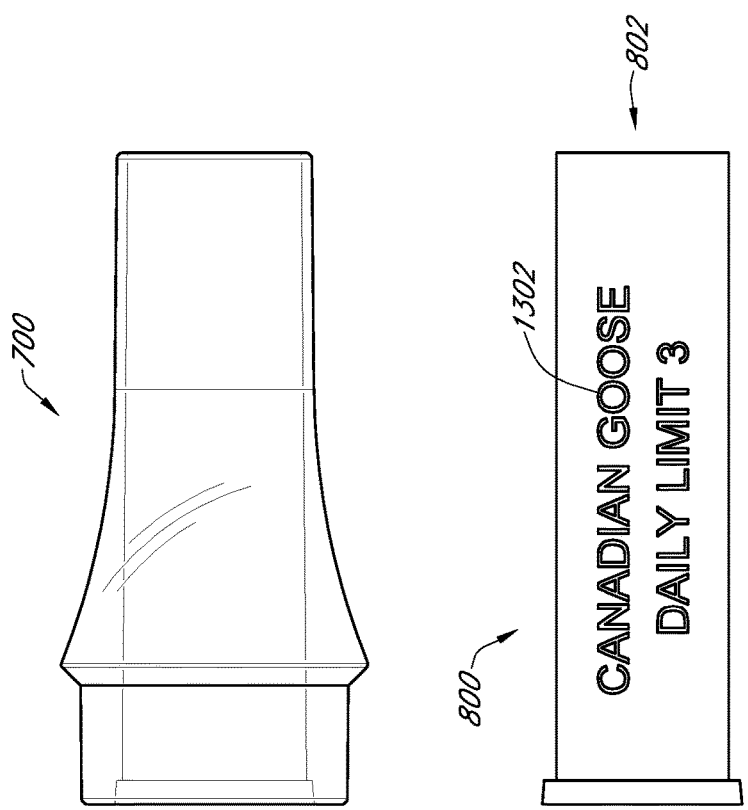
FIG. 13 is a perspective view of an alternate version of the component of FIG. 8, together with the component of FIG. 7.
Figure 14:
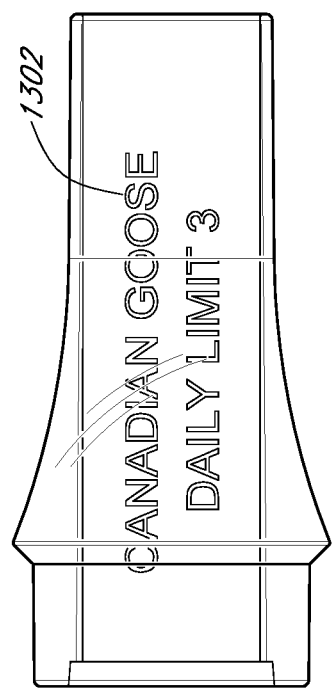
FIG. 14 is a subassembly of the components of FIG. 13.

Now referring to FIGS. 13 and 14, one of the beneficial aspects of the present invention is the ability to provide visual inspection of an internal protected surface of the game call. This surface can be photographic camouflage, an advertisement, information relating to the identification of and the regulations in relation to the game animals being sought by the users of the game call. For example, a Canada Goose call may have an image of a Canada Goose and may have text explaining the dates of the hunting season, bag limits etc. These differing visual patterns could be a removable sleeve that fit over the inner tube 800 before it is inserted into the transparent cover 700. In some embodiments, they could be replaced each year to reflect changes in regulations, etc. In such embodiments, there would be no ultrasonic welding used in the assembly and the game call mouthpiece 600, the transparent cover 700, the inner tube 800 and the outlet end cap 900 could all be friction fit or could be used with some light adhesive material. This adhesive could be chosen from a group of adhesive which could be overcome by application of sufficient mechanical force which may or may not be reduced by the prior use of solvents.

It is thought that the method and apparatus of the present invention will be understood from the foregoing description, and it will be apparent that various changes may be made in the form, construction, steps and arrangement of the parts and steps thereof, without departing from the spirit and scope of the invention, or sacrificing all of the material advantages, the form herein described being merely a preferred or exemplary embodiment thereof.

We claim:

1. A photographically patterned camouflage scent-free game call comprising:
    a game call reed insert;
    a game call reed cover, which is matched with said game call reed insert, so that when said game call reed insert is inserted into said game call reed cover, and air is blown through said game call reed cover, a sound is made which emulates a sound made by an animal;
    said game call reed cover further comprising:
        an inner tube, wherein said inner tube has an inner cylindrical surface and an outer cylindrical surface; said inner cylindrical surface being sized and configured to receive and to retain, with friction therein, a portion of said game call reed insert;
        a first predetermined patterned image disposed on said outer cylindrical surface of said inner tube;
        an outer transparent member;
        said outer transparent member having a cylindrical inner surface which is sized and configured to receive therein said first predetermined patterned image and a portion of said inner tube;
        said outer transparent member having a contoured outer surface, having a differential thickness characteristic, through which said first predetermined patterned image can be seen;
        a game call mouthpiece disposed over said outer transparent member;
        an outlet end cap detachably disposed over an end of said outer transparent member opposing said game call mouthpiece; and
        wherein said inner tube is a removable flanged sleeve insert which is accessed by removing said outlet end cap.

2. The game call of claim 1, wherein said outer transparent member is ultrasonically welded to said game call mouthpiece.

3. The game call of claim 1 where: said animal is a predetermined species; and said first predetermined patterned image is a cylindrical wrapped patterned image of information relating to said predetermined species.

4. The game call of claim 1, wherein said predetermined patterned image is text.

5. The game call of claim 1, wherein said game call mouth piece is detachably coupled to said outer transparent member.

6. The game call of 1 wherein said game call mouth piece further comprising concentric annular protuberances disposed therein.

7. A method of making a scent-free printed game call comprising the steps of:
    providing a game call reed insert; comprising:
        a reed;
        a sounding board, disposed immediately adjacent to said reed; where said sounding board and said reed are configured to emulate a sound of a predetermined species;
        a hollow handle end coupled to said sounding board;
    providing an inner tube having an inner cylindrical surface and an outer cylindrical surface; said inner cylindrical surface being sized and configured to receive and to retain, with friction therein, a portion of said game call reed insert, including said sounding board and said reed;
    disposing a first predetermined patterned image around said outer cylindrical surface;
    disposing a transparent cover with a cylindrical inner cover surface over said first predetermined patterned image; and
    wherein said step of disposing a transparent cover is accomplished by inserting into an end of the transparent cover, said inner tube, having said first predetermined patterned image disposed thereon.

8. The method of claim 7, wherein said first predetermined image pattern is a digitally reproduced image corresponding to a previously created image.

9. The method of claim 8, wherein said digitally reproduced image is substantially identical to said previously created image, which is a photographic image of information relating to said predetermined species.

10. A method of making a scent-free printed game call comprising the steps of:
    providing a game call reed insert; comprising:
        a reed;

a sounding board, disposed immediately adjacent to said reed; where said sounding board and said reed are configured to emulate a sound of a predetermined species;

a hollow handle end coupled to said sounding board;

providing an inner tube having an inner cylindrical surface and an outer cylindrical surface; said inner cylindrical surface being sized and configured to receive and to retain, with friction therein, a portion of said game call reed insert, including said sounding board and said reed;

disposing a first predetermined patterned image around said outer cylindrical surface;

disposing a transparent cover with a cylindrical inner cover surface over said first predetermined patterned image;

wherein said step of disposing a transparent cover is accomplished by inserting into an air outlet end of the transparent cover, said inner tube, having said first predetermined patterned image disposed thereon.

11. The method of claim 10 further comprising the steps of:
placing a game call mouthpiece over a first end of said transparent cover;
placing an outlet end cap over said air outlet end of said transparent cover; and
inserting said game call reed insert through an orifice in said outlet end cap.

12. The method of claim 11 further comprising the steps of ultrasonically welding said game call mouth piece to said transparent cover and ultrasonically welding said outlet end cap to one of said inner tube and said transparent cover.

13. The method of claim 11 further comprising the steps of pressing said game call mouth piece onto said transparent cover and pressing said outlet end cap onto said transparent cover.

14. The method of claim 13 further comprising the steps of:
removing the game call reed insert from the orifice in the outlet end cap;
removing the outlet end cap from the transparent cover;
removing the inner tube from the transparent cover;
removing the first predetermined patterned image from said inner tube;
replacing the first predetermined patterned image with a second predetermined patterned image;
placing the game call mouthpiece over the first end of said transparent cover;
placing the outlet end cap over said air outlet end of said transparent cover; and
inserting said game call reed insert through the orifice in said outlet end cap.

15. The method of claim 14 wherein said second predetermined patterned image is substantially identical to said first predetermined patterned image.

16. A game call comprising:
a game call reed insert;
a game call reed cover, which is matched with said game call reed insert, so that when said game call reed insert is inserted into said game call reed cover, and air is blown through said game call reed cover, a sound is made which emulates a sound made by an animal;
said game call reed cover further comprising:
an inner tube, wherein said inner tube has an inner cylindrical surface and an outer cylindrical surface; said inner cylindrical surface being sized and configured to receive and to retain, with friction therein, a portion of said game call reed insert;
a first predetermined patterned image disposed on said outer cylindrical surface of said inner tube;
an outer transparent member;
said outer transparent member having a cylindrical outer member inner surface, which is sized and configured to receive therein a portion of said inner tube;
said outer transparent member having a contoured outer surface, having a differential thickness characteristic, through which said first predetermined patterned image can be seen; and
wherein said inner tube is a removable sleeve insert which is accessed through an end of said outer transparent member.

17. The game call of claim 16 wherein said first predetermined patterned image is a substantially identical reproduction of a preexisting image.

* * * * *